United States Patent
Agasti et al.

(10) Patent No.: US 12,288,216 B2
(45) Date of Patent: *Apr. 29, 2025

(54) MERCHANDISE RETURN AND/OR EXCHANGE SYSTEMS, METHODS, AND MEDIA

(71) Applicant: Transform SR Brands LLC, Hoffman Estates, IL (US)

(72) Inventors: Varun Reddy Agasti, Schaumburg, IL (US); Leena Munjal, Algonquin, IL (US); Sneha Narahalli, Schaumburg, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/529,353

(22) Filed: Nov. 18, 2021

(65) Prior Publication Data
US 2022/0076260 A1    Mar. 10, 2022

Related U.S. Application Data

(63) Continuation of application No. 14/201,363, filed on Mar. 7, 2014, now Pat. No. 11,205,181.

(51) Int. Cl.
G06Q 40/00    (2023.01)
G06Q 20/32    (2012.01)
G06Q 20/40    (2012.01)

(52) U.S. Cl.
CPC ......... *G06Q 20/407* (2013.01); *G06Q 20/322* (2013.01); *G06Q 20/3224* (2013.01)

(58) Field of Classification Search
CPC . G06Q 20/322; G06Q 20/3224; G06Q 20/407
See application file for complete search history.

(56) References Cited

U.S. PATENT DOCUMENTS 5,734,971 A    3/1998 Thayer
6,026,375 A    2/2000 Hall et al.
(Continued)

FOREIGN PATENT DOCUMENTS

WO    2004072762 A2    8/2004
WO    2006113223 A2    10/2006
(Continued)

OTHER PUBLICATIONS

Parker, Jackson (Shopping Center Tracking System Monitors Your Every Move; https://fieldlogix.com/news/shopping-center-tracking-system-monitors-your-every-move/; paragraphs 1 and 3; Jan. 9, 2012) (Year: 2012).*

(Continued)

*Primary Examiner* — Mark H Gaw
(74) *Attorney, Agent, or Firm* — McAndrews, Held & Malloy, Ltd.

(57) ABSTRACT

Systems, methods, and apparatus are disclosed that provide a merchandise return and/or exchange process for items purchased from brick-and-mortar and/or e-commerce stores. In some embodiments, a mobile computing device of a customer may determine whether the mobile computing device and therefore the customer are in a defined zone for a store. In response to determining that the mobile computing device is in the defined zone, the mobile computing device may notify the customer and request whether the customer wishes to initiate a return and/or exchange of purchased items to the store. The mobile computing device may notify a merchandise pickup system of the customer's desire to return the purchased items.

12 Claims, 5 Drawing Sheets

(56) References Cited

U.S. PATENT DOCUMENTS

| | | | |
|---|---|---|---|
| 6,085,172 A * | 7/2000 | Junger | G06Q 40/12 705/28 |
| 6,321,211 B1 | 11/2001 | Dodd | |
| 6,536,659 B1 * | 3/2003 | Hauser | G06Q 30/06 235/383 |
| 6,880,750 B2 | 4/2005 | Pentel | |
| 6,954,735 B1 | 10/2005 | Djupsjobacka | |
| 7,162,440 B2 * | 1/2007 | Koons | G06Q 30/0617 705/28 |
| 7,376,572 B2 * | 5/2008 | Siegel | G06Q 10/0833 705/1.1 |
| 7,606,718 B2 * | 10/2009 | Cloran | G06Q 30/016 379/265.09 |
| 7,797,164 B2 | 9/2010 | Junger et al. | |
| 7,859,411 B2 | 12/2010 | Chakraborty | |
| 8,104,682 B2 * | 1/2012 | Junger | G06Q 30/06 705/28 |
| 8,156,007 B1 | 4/2012 | Anthony et al. | |
| 8,200,550 B2 | 6/2012 | Altkins | |
| 8,275,667 B1 * | 9/2012 | Goel | G06Q 10/025 705/26.7 |
| 8,386,337 B2 | 2/2013 | Siegel | |
| 8,676,653 B2 * | 3/2014 | Argue | G06Q 20/3276 705/17 |
| 2001/0032062 A1 | 10/2001 | Plaskoff | |
| 2001/0037207 A1 | 11/2001 | Dejaeger | |
| 2002/0010634 A1 | 1/2002 | Roman | |
| 2002/0019785 A1 * | 2/2002 | Whitman | G06Q 30/06 705/28 |
| 2002/0062260 A1 | 5/2002 | Inoue | |
| 2002/0107715 A1 | 8/2002 | Pace et al. | |
| 2002/0111881 A1 | 8/2002 | Walker et al. | |
| 2002/0143655 A1 | 10/2002 | Elston et al. | |
| 2005/0251440 A1 * | 11/2005 | Bednarek | G06Q 30/0203 705/7.32 |
| 2006/0076397 A1 | 4/2006 | Langos | |
| 2006/0178943 A1 | 8/2006 | Rollinson et al. | |
| 2007/0088624 A1 | 4/2007 | Vaughn et al. | |
| 2007/0106468 A1 | 5/2007 | Eichenbaum et al. | |
| 2007/0124216 A1 | 5/2007 | Lucas | |
| 2007/0138268 A1 | 6/2007 | Tuchman | |
| 2007/0187183 A1 * | 8/2007 | Saigh | E04H 14/00 186/53 |
| 2007/0257774 A1 | 11/2007 | Stumpert et al. | |
| 2008/0046385 A1 | 2/2008 | Dube et al. | |
| 2008/0091446 A1 * | 4/2008 | Vengerov | G06Q 10/087 705/28 |
| 2008/0228600 A1 | 9/2008 | Treyz et al. | |
| 2009/0076870 A1 * | 3/2009 | Hammond | G06Q 20/202 705/28 |
| 2009/0187488 A1 | 7/2009 | Shamilian | |
| 2009/0187489 A1 | 7/2009 | Mallick et al. | |
| 2009/0281903 A1 | 11/2009 | Blatstein | |
| 2010/0088148 A1 | 4/2010 | Presswala et al. | |
| 2010/0131420 A1 * | 5/2010 | Williams | G06Q 10/083 715/810 |
| 2010/0293106 A1 | 11/2010 | Rhoads et al. | |
| 2011/0010261 A1 | 1/2011 | Inskeep | |
| 2011/0055046 A1 | 3/2011 | Bowen | |
| 2011/0130129 A1 | 6/2011 | Snyder et al. | |
| 2011/0191212 A1 * | 8/2011 | Iburg | G06Q 30/0283 705/28 |
| 2011/0218884 A1 | 9/2011 | Kothari | |
| 2011/0258058 A1 | 10/2011 | Carroll et al. | |
| 2013/0009774 A1 * | 1/2013 | Sabeta | G06Q 30/016 340/540 |
| 2013/0030945 A1 | 1/2013 | Polt | |
| 2013/0085889 A1 * | 4/2013 | Fitting | G06Q 30/06 705/26.35 |
| 2013/0096966 A1 | 4/2013 | Barnes, Jr. | |
| 2014/0040053 A1 * | 2/2014 | Argue | G06Q 20/047 705/17 |
| 2014/0064116 A1 * | 3/2014 | Linde | H04L 67/06 370/252 |
| 2015/0054620 A1 * | 2/2015 | Graube | G06K 7/10009 340/10.1 |

FOREIGN PATENT DOCUMENTS

| | | |
|---|---|---|
| WO | 2008014255 A2 | 1/2008 |
| WO | 2011005072 A2 | 1/2011 |

OTHER PUBLICATIONS

Int'l Search Report and Written Opinion Appln No. PCT/US2013/023202 dated May 15, 2013.

Mo et al, "RFID Infrastructure for Large Scale Supply Chains Involving Small and Medium Enterprises.", In: Sustainable Radio Frequency Identification Solutions, Bok edited by: Cristina Turcu, ISBN 978-953-7619-74-9, pp. 356, Feb. 2010, INTECh, Croatia, downloaded from sciyo.com.

"More Casual Restaurants trying Curbside Delivery", Horovitz, May 30, 2002, retrieved from http://usatoday30.usatoday.com/money/general/2002/05/31/curbside-dinig.htm.

"Publix Cancels Curbside Pickup", Jan. 22, 2012, retrieved from http://retailtechnologytrends.com/tag/augmented reality, p. 8.

"Retro Drive-in with Curbside Pickup", Sep. 18, 2012, retrieved from http://blog.munchery.com/2012/09/retro-drive-in-with-curbside-pickup, p. 1.

Int'l Search Report and Written Opinion Appln No. PCT/US2012/058238 dated Jan. 9, 2013.

Appleinsider, "Apple Said to Release iPhone App for In-Store Appointments" (http://forums.appleinsider.com/t/104828/apple-said-to-release-iphone-app-for-in-store-appointments) (Available Nov. 16, 2009), pp. 13.

"2013.11—Retail Tech Miscellany", Mar. 27, 2013, retrieved from http://retailtechnologytrends.com/tag/augmented-reality/, 7 pages.

Holland, Rebecca, "Site-to-store policies help cut down on shipping costs", The Roanoke Times (May 2011), retrieved from http://www.roanoke.com/life/columns_and_blogs/columns/shoptimist/site-to-store-policies-help-cut-down-on-shippping-costs/article_5d0397e6-e348-51c7-926f-b27c9573b793.html on Jan. 30, 2015, pp. 1.

Ryah, Darron, "Home Depot Now Offers Buy Online, Pick Up or Return In-Store Service", The Apron Blog, retrieved from http:/ext.homedepot.com/community/blog/home-dpot-now-offers-buy-online-pick-up-in-store-service/ on Jan. 30, 2015, pp. 2.

Collins, Galen (Creating Usable Mobile Ambient Intelligent Applications For Hospitality Customers https://scholarworks.umass.edu/bitstreams/d5215d27-604f-4b9a-b4eb-215de0682940/download) Jul. 31, 2010.

* cited by examiner

MERCHANDISE RETURN AND/OR EXCHANGE SYSTEMS, METHODS, AND MEDIA

The present application is a continuation of U.S. application Ser. No. 14/201,363, filed Mar. 7, 2014. This document is hereby incorporated herein by reference in its entirety.

FIELD OF THE INVENTION

The invention relates generally to returning and/or exchanging merchandise, and more specifically, to services associated with physically returning merchandise to and/or physically exchanging merchandise at a brick-and-mortar store.

BACKGROUND

Customers commonly purchase merchandise from brick-and-mortar stores such as retail stores, grocery stores, consumer electronic boutiques, etc. When purchasing merchandise from such stores, a customer often selects and places such merchandise in a shopping cart or basket. The customer then proceeds to a checkout lane where a sales associate scans or otherwise enters each item of merchandise into a point-of-sale (POS) terminal in order to determine the total purchase price for the selected merchandise. The sales associate collects payment from the customer and provides the customer with a proof of purchase such as a sale receipt. After checking out via one of the provided checkout lanes, the customer may then leave the brick-and-mortar store with the purchased merchandise.

Customers may also purchase merchandise from e-commerce sites or via a mobile application. When purchasing merchandise using such sites or applications, a customer often selects and places merchandise in a virtual shopping cart or basket. After selecting merchandise, the customer then proceeds through a checkout process where the site determines the total purchase price for the selected merchandise, collects shipping details such as the name and address of the recipient, collects payment from the customer, and provides the customer with a proof of purchase. After checking out, the purchased merchandise are shipped to the recipient address.

After purchasing the merchandise, the customer may later wish to return and/or exchange one or more of the purchased items. Customers may wish to return and/or exchange an item for a number of different reasons. For example, a customer may have purchased an item as a gift for another person who already has the item. As another example, the purchased item may be the wrong size. In such a situation, the customer may wish to return the purchased item in exchange for an item of the proper size. Regardless of the reason, brick-and-mortar stores and e-commerce sites generally have a return policy that permits their customers to return items for a refund and/or permits their customers to return items in exchange for other items.

Unfortunately, the return and/or exchange process of many brick-and-mortar stores and e-commerce sites is time consuming and quite often not customer friendly. As a result, customers may develop a negative view of a brick-and-mortar store or e-commerce site as a result of the return process. As may be appreciated, processes that result in customers viewing a store in a negative manner are not conducive to the store retaining customers and developing customer loyalty.

Thus, the return and/or exchange processes of conventional brick-and-mortar stores and e-commerce sites may be effective. Via such conventional processes, customers are able to ultimately return and/or exchange an item. However, as will become apparent from the following, conventional return processes may be improved in order to better a customer's overall shopping experience and strengthen customer loyalty.

BRIEF SUMMARY OF THE INVENTION

Systems, methods, and computer readable medium directed to the return and/or exchange of merchandise are substantially shown in and/or described in connection with at least one of the figures, and are set forth more completely in the claims.

These and other advantages, aspects and novel features of the present invention, as well as details of illustrated embodiments thereof, will be more fully understood from the following description and drawings.

DETAILED DESCRIPTION OF THE INVENTION

Some disclosed embodiments are directed to physically returning and/or exchanging merchandise at a brick-and-mortar store. More specifically, some disclosed embodiments leverage mobile devices, such as cellular phones, smart phones, tablet devices, etc., that are commonly in the possession of customers to detect a customer's location. The detected customer location may be utilized to assist in expediting the process of returning and/or exchanging merchandise that has been purchased from brick-and-mortar stores and/or e-commerce sites. Besides expediting the process, some embodiments further permit a customer to return purchased items without leaving their vehicle. Some embodiments also permit the customer to exchange merchandise without leaving their vehicle. An exchange of merchandise generally involves returning merchandise, receiving other merchandise in-exchange, and financially settling any price difference between the returned merchandise and the received in-exchange merchandise.

Various embodiments are described in the context of a customer returning and/or exchanging merchandise previously purchased from a retail store. However, some aspects of the disclosed embodiments may also apply to other types of businesses or merchandising vehicles such as department stores, consumer malls, grocery stores, service centers, repair centers, e-commerce sites, mobile applications, shipping services, etc. Embodiments, for use in such contexts, are envisioned and protection for such embodiments is sought to the extent encompassed by the appended claims.

Customers demand convenience, speed, and selection from their retailers regardless of whether they are shopping online or in a brick-and-mortar store. The following describes various ways a mobile computing device such as a tablet, smart phone, mobile phone, personal data assistant, hand-held gaming console, or some other form of mobile computing device may be used to facilitate the return and/or exchange of purchased merchandise.

Figure 1:
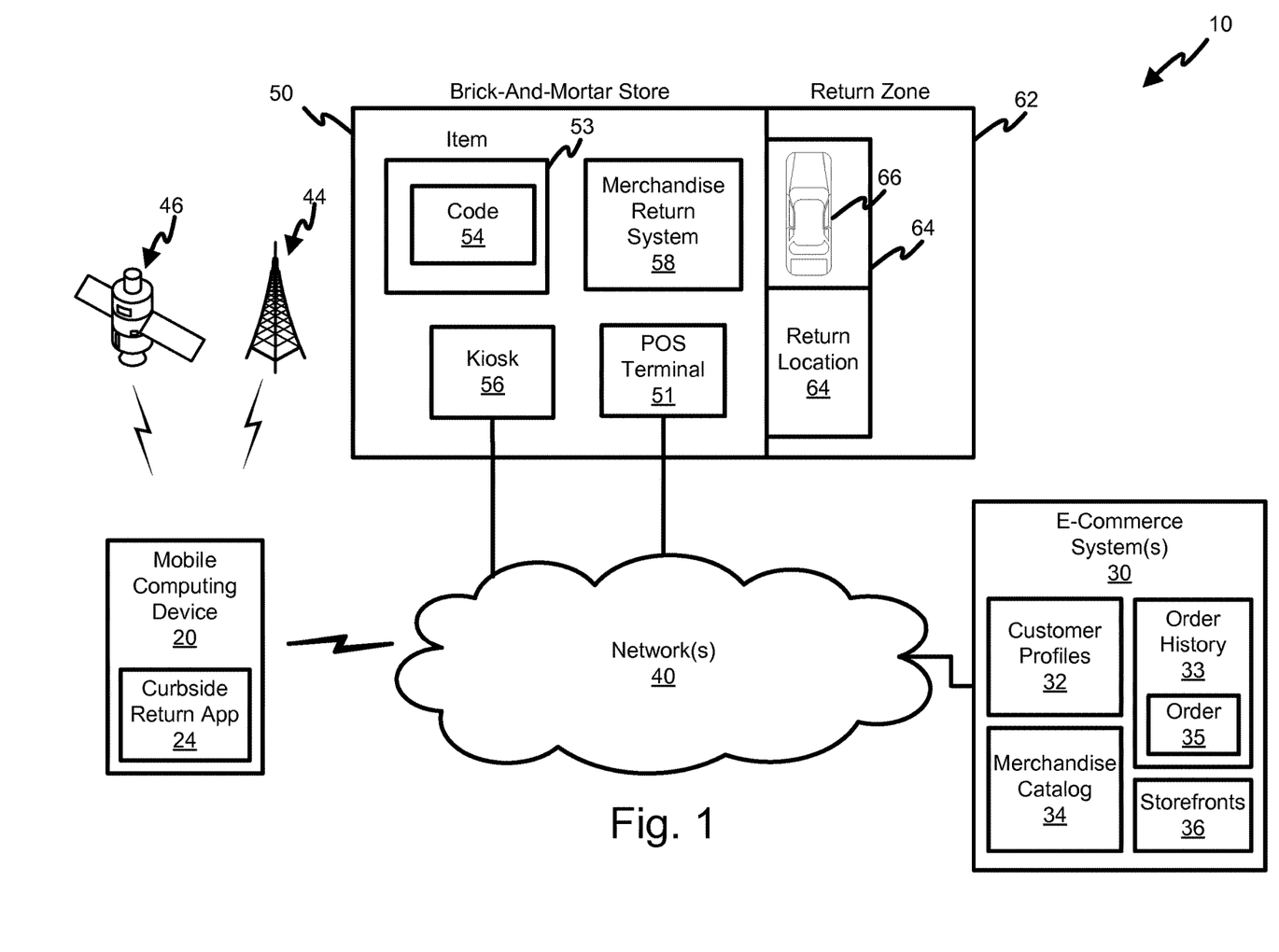
FIG. 1 shows a return fulfillment system in accordance with an example embodiment of the present invention.

Referring to FIG. 1, a return fulfillment system 10 is depicted that facilitates the return and/or exchange of merchandise. As noted above, exchanging merchandise generally involves returning merchandise plus receiving other merchandise in-exchange, and possibly financially settling any price difference between the returned merchandise and the received in-exchange merchandise. Thus, in the interest of convenience, the following describes the return fulfillment system 10 from the standpoint of returning merchandise regardless of whether in-exchange merchandise is received as part of the return since an exchange may be viewed as a return that involves receiving merchandise in exchange for returned merchandise.

As shown, the return fulfillment system 10 may include a mobile computing device 20 connected to an e-commerce system 30 and a merchandise return (MR) system 58 via one or more networks 40. The networks 40 may include a number of private and/or public networks such as, for example, wireless and/or wired LAN networks, cellular networks, and the Internet that collectively provide a communication path and/or paths between the mobile computing devices 20, the e-commerce system 30, and the MR system 58.

The mobile computing devices 20 may include tablets, smart phones, mobile phones, personal data assistants, hand-held gaming consoles, and/or other forms of mobile computing devices which enable a user to communicate with the e-commerce system 30 and/or MR system 58 via the network 40. As shown, the mobile computing device 20 may include a merchandise return (MR) application 24. The application 24 may comprise instructions that, in response to being executed by the mobile computing device 20, cause the mobile computing device 20 to perform various tasks associated with the merchandise return process described in detail below with respect to FIGS. 3-5. In some example embodiments, the mobile computing device 20 may download the application 24 from various online application stores. Moreover, while depicted in FIG. 1 as a separate application, the merchandise return functionality of application 24 may be incorporated into a larger application that provides functionality beyond that depicted in the merchandise return processes of FIGS. 3-5.

The e-commerce system 30 may include one or more web servers, database servers, routers, load balancers, and/or other computing and/or networking devices. The e-commerce system 30 may maintain customer profiles 32 and order histories 33 for various customers that utilize the shopping services provided by the system 10. The order histories 33 may include details regarding each order 35 placed by the customer. Moreover, the e-commerce system 30 may maintain a merchandise catalog 34 that includes information regarding items 53 for sale by the brick-and-mortar store 50.

Furthermore, the e-commerce system 30 may provide one or more online storefronts 36 that permit customers to purchase items 53 using a computing device. In some embodiments, one or more of the storefronts 36 are publicly accessible via a public network such as the Internet thus permitting customers to purchase items 53 from such storefronts 36 from the comfort of their homes or from other locations. In some embodiments, one of more of the storefronts 36 are not publicly accessible but limited to computing devices such as kiosk 56 within the store 50.

As shown, the brick-and-mortar store 50 may include point-of-sale (POS) terminals 51 and the MR system 58. The MR system 58 may include one or more web servers, database servers, routers, load balancers, and/or other computing and/or networking devices. As explained in greater detail below with respect to the merchandise return processes of FIGS. 3-5, the MR system 58 may facilitate the return purchased merchandise, and may, in particular, permit customers to return merchandise without leaving the comfort of their vehicle 66. As explained below, a customer may park her vehicle 66 at a designated location of a merchandise return (MR) zone 62 such as, for example, return location 64. A merchandise return (MR) associate or other store personnel may then be dispatched to the customer's parked vehicle 66 to complete the return of the merchandise. Moreover, if the returned merchandise is being exchanged for other merchandise, the MR associate or other store personnel may further deliver the in-exchange merchandise to the customer's parked vehicle 66 while collecting the returned merchandise.

As shown in FIG. 1, the return location 64 may be a curbside location adjacent or near the store 50. However, in other embodiments, the zone 62 may define return locations 64 for the in-vehicle return process that are not proximate the store 50 or curbside. For example, the return locations 64 may correspond to a designated area of a parking lot which is distant from the store 50.

The store 50 may further include numerous merchandise items 53, which are on display for purchase by customers of the store 50. For example, the store 50 may include shelves, clothing racks, tables, and/or other assemblies upon which merchandise items 53 may be placed in a customer accessible manner so that the customer may physically interact with the items 53. More specifically, the store 50 may display the merchandise items 53 in a manner which permits a customer to pickup the items 53 they want to purchase and place them in a shopping basket or wheeled shopping cart. The customer may then carry the selected items 53 to a POS terminal 51 where a store associate may scan codes 54 of the selected items 53, determine a total purchase price for the selected items 53, and receive payment from the customer for the selected items 53. The POS terminal 51 may further provide details regarding the purchased items to the e-commerce system 30 so that the e-commerce system 30 may update the customer's order history 33. Besides supporting sales via POS terminals 51, the store 50 may further permit the sale of items 53 via mobile computing device 20, kiosks 56, and/or one or more online storefronts 36 provided by the e-commerce system 30.

FIG. 1 depicts an example embodiment of the return fulfillment system 10. However, the return fulfillment system 10 may be implemented in numerous different manners using a wide range of different computing devices, platforms, networks, etc. Moreover, aspects of the return fulfillment system 10 may be implemented using a client/server architecture, a peer-to-peer (P2P) architecture, and/or another networking architecture. Such embodiments are envisioned and protection for such embodiments is sought to the extent encompassed by the appended claims.

Figure 2:
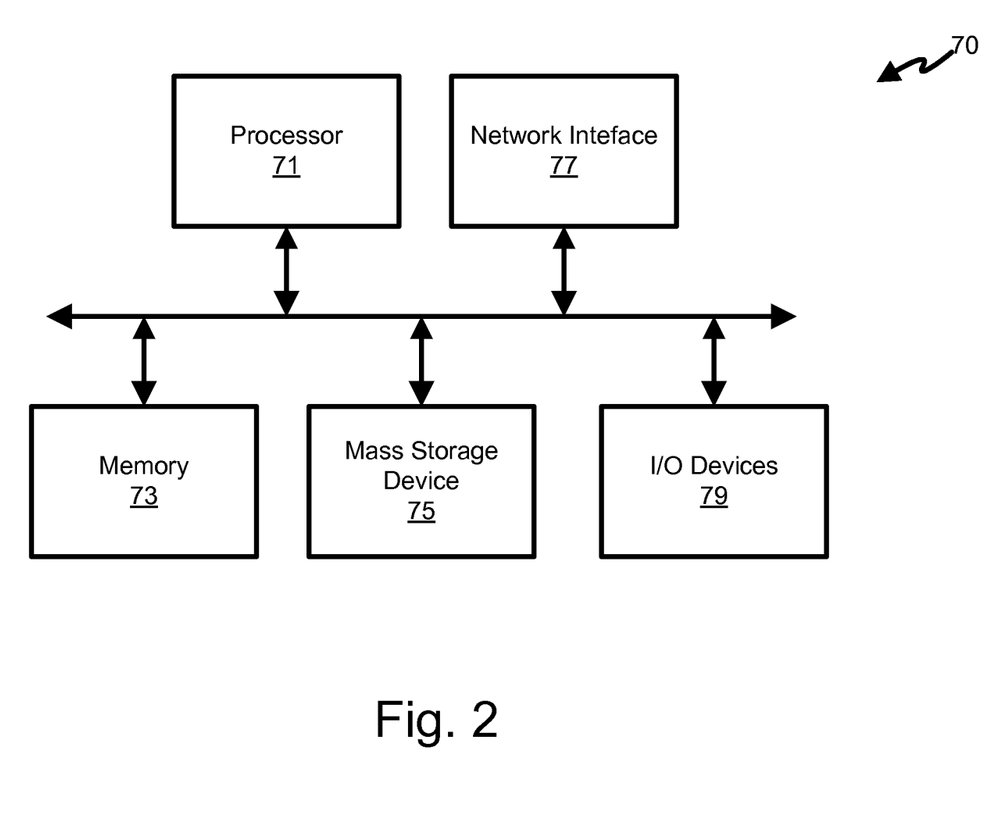
FIG. 2 shows a simplified depiction of a example computing device for use in the system of FIG. 1.

In some embodiments, the mobile computing device 20, the e-commerce system 30, POS terminals 51, kiosks 56, and/or MR system 58 may be implemented using various types of computing devices. FIG. 2 provides a simplified depiction of a computing device 70 suitable for such aspects of return fulfillment system 10. As shown, the computing device 70 may include a processor 71, a memory 73, a mass storage device 75, a network interface 77, and various input/output (I/O) devices 79. The processor 71 may be configured to execute instructions, manipulate data and generally control operation of other components of the computing device 70 as a result of its execution. To this end, the processor 71 may include a general purpose processor such as an ×86 processor or an ARM processor which are available from various vendors. However, the processor 71 may also be implemented using an application specific processor and/or other circuitry.

The memory 73 may include various types of random access memory (RAM) devices, read only memory (ROM) devices, flash memory devices, and/or other types of volatile or non-volatile memory devices. In particular, such memory devices of the memory 73 may store instructions and/or data to be executed and/or otherwise accessed by the processor 71. In some embodiments, the memory 73 may be completely and/or partially integrated with the processor 71.

In general, the mass storage device 75 may store software and/or firmware instructions which may be loaded in memory 73 and executed by processor 71. The mass storage device 75 may further store various types of data which the processor 71 may access, modify, and/otherwise manipulate in response to executing instructions from memory 73. To this end, the mass storage device 75 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 77 may enable the computing device 70 to communicate with other computing devices via network 40. To this end, the networking interface 77 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc) or near field communication (NFC) interface, and/or some other type of networking interface capable of providing a communications link between the computing device 70 and network 40 and/or another computing device.

Finally, the I/O devices 79 may generally provide devices which enable a user to interact with the computing device 70 by either receiving information from the computing device 70 and/or providing information to the computing device 70. For example, the I/O devices 79 may include display screens, keyboards, mice, touch screens, microphones, audio speakers, digital cameras, optical scanners, RF transceivers, etc.

In some embodiments, the I/O devices 79 of the mobile computing device 20 may include a geographic positioning system (GPS) receiver to permit the mobile computing device 20 to determine its global position. In particular, the GPS receiver may be configured to receive signals from GPS satellites 46 and ascertain the geographic position of the GPS receiver based on such received GPS satellite signals. In other embodiments, the I/O devices 79 of the mobile computing device 20 may not include a GPS receiver, but the mobile computing device 20 may be able to determine its position nonetheless. For example, as noted above, the network interface 77 may include a cellular interface (GSM, CDMA, LTE, etc). Such a cellular interface may permit the mobile computing device 20 to receive signals from various cell towers 44. Based on known positions of the cell towers 44 and the signals received from such towers 44, the mobile computing device 20 may be able to discern its position (e.g., using triangulation).

While the above provides some general aspects of a computing device 70, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 70 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

As mentioned above, the return fulfillment system 10 may facilitate the return of merchandise in a manner that enhances and/or otherwise improves a customer's shopping experience. To this end, the return fulfillment system 10 may support in-vehicle return of merchandise that was previously purchased from the a brick-and-mortar store 50, another affiliated brick-and-mortar store 50, and/or an on-line storefront associated with the brick-and-mortar store 50. As explained below, the order fulfillment system 10 may permit a customer to return merchandise for refund and/or exchange without leaving the customer's vehicle 66 and entering the store 50.

Figure 3:
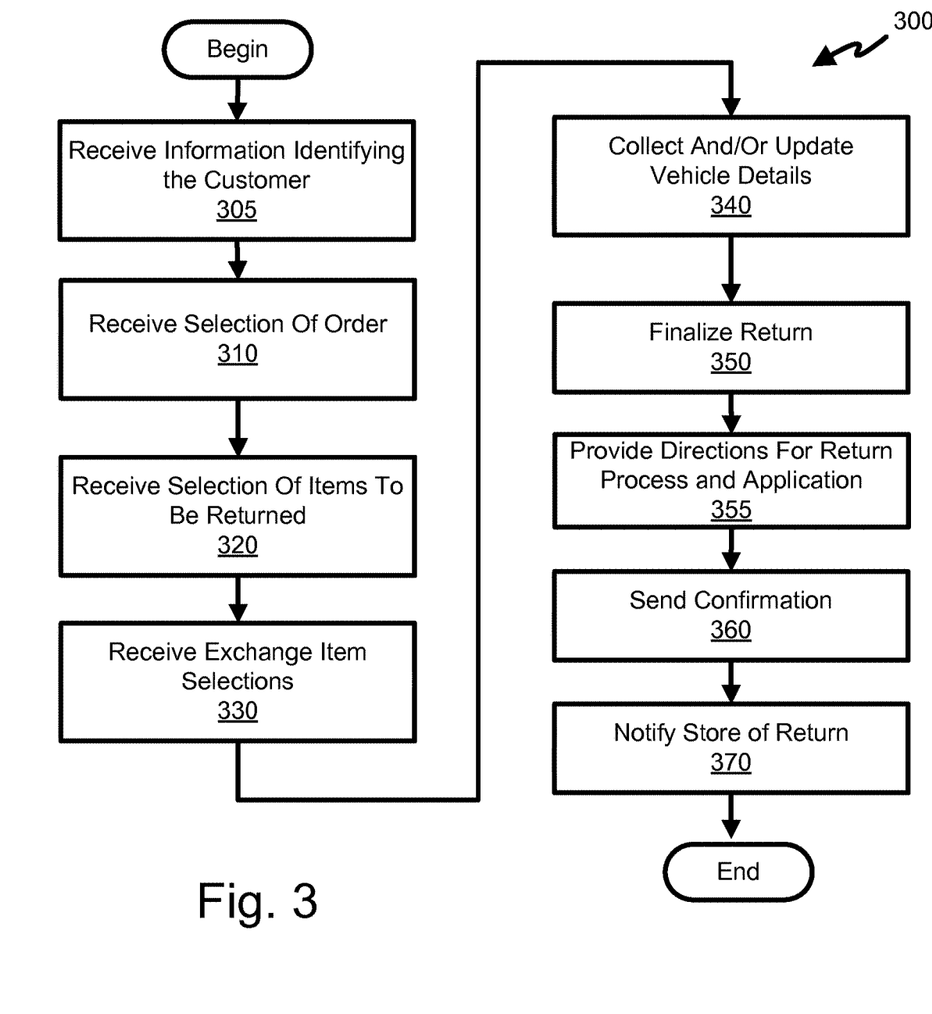
FIG. 3 shows a process implemented by an example embodiment of the e-commerce system of FIG. 1

FIG. 3 shows a process 300 for generating a in-vehicle return request that may be implemented by an example embodiment of the e-commerce system 30. Per the process 300, the e-commerce system 30 may permit a customer to select previously purchased items 53 for in-vehicle return. Moreover, the e-commerce system may permit the customer to define other parameters regarding the return. For example, the e-commerce system 30 may permit the customer to select the store 50 to which the items 53 are to be returned, select items to be received in exchange, provide details regarding the vehicle 66 to be used for the return, and/or other aspects of the return.

To this end, the e-commerce system 30 at 305 may receive information from the customer via which the e-commerce system 30 may identify the customer and retrieve the appropriate profile 32 and order history 33 for the customer. In particular, the e-commerce system 30 may present an interface via which the customer may enter a username and password. The e-commerce system 30 may use the received identifying information to authenticate the customer and retrieve the profile 32 and order history 33 associated with the customer.

The e-commerce system 30 at 310 may receive a selection that identifies the order or orders 35 associated with the item or items 53 to be returned. To this end, the e-commerce system 30 may present the retrieved order history 33 to the customer in a manner that permits the customer to review orders 35 in the history 33 and select the presented order or orders 35 that contains the item or items 53 to be returned. For example, the e-commerce system 30 present an interface with which the customer may interact using a mobile phone, a tablet, a laptop, a desktop, or another computing device capable of communicating with a storefront 36 via a public network such as the Internet. Via such interface and computing device, the customer may select the order or orders 35 that contains the item or items 53 to be returned and the e-commerce system 30 may receive data representative of the customer's selected order or orders 35.

After receiving the order selection, the e-commerce system 30 at 320 may receive a selection that identifies the item or items 53 to be returned. To this end, the e-commerce system 30 may present an interface via which the customer may select the item or items 53 to be returned. For example, the e-commerce system 30 may present the items 53 of the selected order or orders 35 with associated check-boxes, drop-downs, and/or other input controls. Via an appropriate computing device, the customer may view the items 53 and actuate one or more of the associated input controls in order to select the item or items 53 to be returned. In response to such item selection, the e-commerce system 30 may receive data representative of the customer's selected item or items 53.

After receiving the item selection, the e-commerce system 30 at 330 may receive a selection that identifies an item or items 53 to be received in exchange. To this end, the e-commerce system 30 may present an interface via which the customer may select the item or items 53 to be received in exchange. For example, the e-commerce system 30 may present an interface that permits the customer to identify the item or items 53 by altering one or more aspects of the item or items 53 to be returned. In particular, the e-commerce system 30 may present associated check-boxes, drop-downs, and/or other input controls that permit the customer to alter aspects of the returned item or items 53. For example, the input controls may permit the customer to request a particular returned item 53 in a different size, color, pattern, etc.

In addition or alternatively, the e-commerce system 30 at 330 may permit the customer to identify the item or items 53 desired in exchange via other mechanisms. For example, the e-commerce system 30 may permit the customer to browse, search, and/or otherwise identify an item or items 53 in the merchandise catalog 34. In this manner, the customer may return an item or items 53 for a completely different item or items 53.

At 340, the e-commerce system 30 may collect information from the customer regarding the vehicle 66 which will be used during the in-vehicle return. For example, the e-commerce system 30 via a computing device 70 may present the customer with a form that permits the customer to select a year, make, model, and color of the vehicle 66 to be used during the in-vehicle return. The form may further provide an option that permits the customer to save the vehicle information to the customer's profile 32. By saving vehicle information to the customer profile 32, the e-commerce system 30 during future returns may present a form which permits the customer to select previously saved vehicle information and which permits the customer to add further vehicle information to the customer profile 32.

The e-commerce system 30 may then finalize the return request at 345. For example, the e-commerce system 30 may verify the store 50 to which the customer wishes to return the purchased item 53, and verify the availability of any in-exchange item 53 to be received in exchange from the selected store 50, verify and preauthorize payment information for the return.

As a result of returning the item or items 53, the customer may be due a credit for the returned item or items 53 assuming no item 53 was received in exchange. If the customer received an item or items 53 in exchange, then the customer may be due a credit or may be required to pay a debit based on whether the value of the returned item or items 53 is greater or less than the in-exchange item or items 53. Accordingly, the e-commerce system 30 may preauthorize the credit/debit in order to expedite the return process once the customer physically brings the returned item or items 53 to the store 50. To this end, the e-commerce system 50 may provide the customer with an interface via which the customer may provide payment information and/or confirm payment information. In one embodiment, the e-commerce system 50 may pre-populate the payment information based on the payment information associated with the selected order or orders 35. For example, if the customer used a credit card to pay for the selected order 35, the e-commerce system 50 may preauthorize the same credit card for application of any credit or debit resulting from the return. In one embodiment, the e-commerce system 50 does not finalize the credit or debit to the card, but forgoes such finalization until which time the customer returns the items or items 53 as explained below in regard to FIG. 5.

At 355, the e-commerce system 30 may provide the customer with directions for returning the item or items 53 to the selected store 50 and for obtaining a copy of the MR application 24. For example, the e-commerce system 30 may provide hyperlinks and/or other mechanisms via which the customer may obtain a copy of the application 24. In particular, the e-commerce system 30, in one embodiment, may inform the customer via computing device 70 that the selected store 50 should be prepared to process the return in less than 2 hours, but that the customer should wait for an email notifying the customer that store 50 is prepared to process the return before traveling to the store 50.

At 360, the e-commerce system 30 may provide the customer with one or more confirmations regarding the requested return. For example, the e-commerce system 30 may cause a web browser of the computing device 70 to display a return merchandise authorization (RMA) code or form and provide a link or other mechanism via which the customer may download and/or print the RMA code. The e-commerce system 30 may further email a receipt or a confirmation to the customer using an email address supplied during the return request process or pulled from the customer profile 32.

At 370, the e-commerce system 30 may notify the MR system 58 for the selected store 50 of the return. Such notice permits one or more MR associates of the store 50 to gather any in-exchange items 53 which the customer is to receive prior to the customer arriving at the store 50. Moreover, as explained in more detail below, the store 50 may notify the customer when the store 50 is ready to process the requested return so that the customer may return the items 53 and receive any in-exchange items 53 without a lengthy wait at the store 50.

While the above describes a process for generating a in-vehicle return request, various modifications are envisioned. For example, the e-commerce system 30 may permit a customer to enter an order number, scan a receipt, scan a product code 54 with their mobile computing device 20 to locate and select the appropriate order 35 from the customer's order history 33. Similarly, the e-commerce system 30 may permit a customer to select items 53 for return by scanning the product codes 54 of such items 53.

Figure 4:
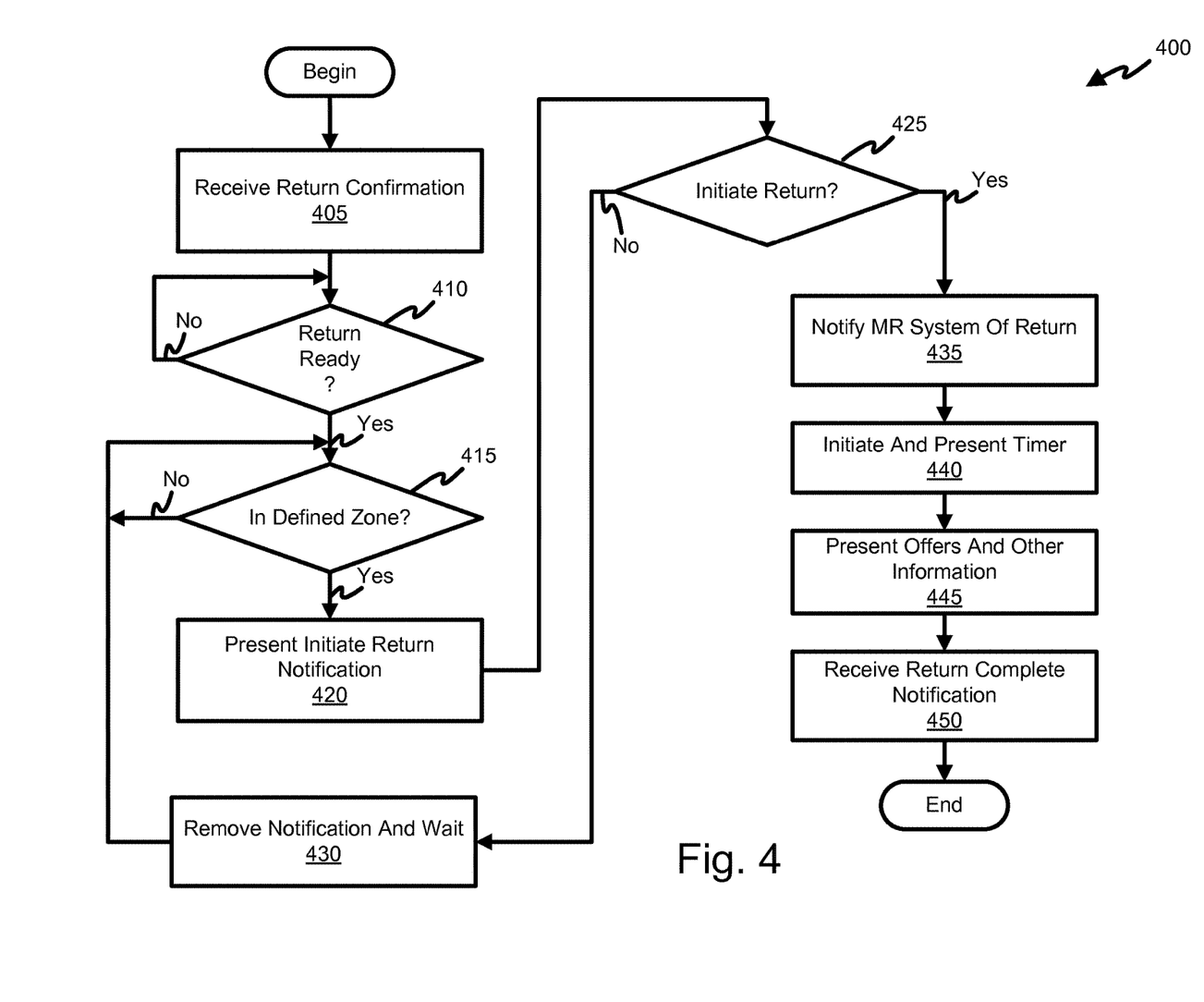
FIG. 4 shows a process implemented by an example embodiment of the mobile computing device of FIG. 1.

Referring now to FIG. 4, a process 400 that may be implemented by mobile computing device 20 and/or the MR application 24 is shown. In the interest of clarity, the following process 400 is described from the standpoint of the application 24 performing various actions. The application 24 does not in fact perform such actions, but instead provides instructions which configure and/or otherwise cause the mobile computing device 20 to perform the respective actions due to execution of such instructions of the application 24. Stating that software and/or firmware modules, such as the application 24, perform various actions is merely a manner of convenience that is in common usage in the industry.

At 405, the mobile computing device 20 and/or the application 24 may receive a message or other notification confirming the return of items 53. As noted above, the e-commerce system 30 at 360 may provide the customer with a confirmation by, for example, sending an email using an email address associated with the customer. The mobile computing device 20 and/or the application 24 at 405 may receive such confirmation from the e-commerce system 30. In some embodiments, the notification may inform the application 24 that the store should soon be ready to process the and that a notification that the store 50 is ready to process the return should be expected in the near future. As such, the application 24 may alter its operation and/or the operation of the mobile computing device 20 in anticipation of the to-be-received notification that indicates the store 50 is ready to process the return. For example, the application 24 may adjust the frequency at which email is checked, adjust power management features, and/or adjust other operating characteristics associated with receiving the notification.

At 410, the application 24 may determine whether a notification that the store 50 is ready to process the return has been received. In some embodiments, the MR system 58 of the selected store 50 may send a notification to the application 24. For example, the MR system 58 may use an address associated with the customer to send or otherwise provide an email message (e.g. Simple Mail Transfer Protocol (SMTP) message), a text message (e.g., a Short Message Service (SMS) message), a push notification (e.g., Apple Push Notification Message), an instant message (e.g., Extensible Messaging and Presence Protocol (XMPP) message), or some other form of message that the store 50 is ready to process the return.

If the notification has yet to be received, the application 24 continues to wait for the notification at 410. Otherwise, the application 24 may proceed to 415 to determine whether the customer's mobile computing device 20 and therefore the customer are within a specified vicinity or within a MR zone 62 of the store 50. In particular, the application 24 and/or the MR system 58 may define the zone 62 using various techniques. For example, the application 24 may determine that the mobile computing device 20 is within the zone 62 in response to detecting a short range signal from the MR system 58 or detecting such a short range signal is above a threshold level. In other embodiments, the application 24 may use global positioning capabilities of the mobile computing device 20 to determine the global position of the mobile computing device 20. The application 24 may then compare the determined global position to a specified zone 62 for the store 50 to determine whether the mobile computing device 20 is within the zone 62 of the store 50.

If the application 24 determines that the mobile computing device 20 is not within the MR zone 62 for the store 50, then the application 24 may continue to monitor the location of the mobile computing device 20 with respect to the zone 62 at 415. Otherwise, the application 24 at 420 may generate a notification that requests whether the customer wants to initiate the in-vehicle return process. The customer may be in the vicinity of the store 50 for reasons other than returning the items 53. By requesting the customer whether to initiate the process, the customer does not feel obligated to return the items 53 when not otherwise prepared. Moreover, MR associates of the store 50 do not waste time trying to collect returned items 53 or gather in-exchange items 53, when such customers were falsely identified as being in the MR zone 62 or otherwise have no intention of returning the items 53 at the present time. As such, the notification presented at 420 may be beneficial to both the customer and the store 50.

If the customer at 425 declines to initiate the in-vehicle return process or ignores the notification at 420, the application 24 at 430 may remove the presented notification and wait before returning to 415. In one embodiment, the application 24 may wait a predetermined or customer specified time before returning to 415. By waiting, the application 24 may prevent the continual presentation of the notification at 420 while the mobile computing device 20 is in the MR zone 62 but the customer does not wish to initiate the in-vehicle return process. In another embodiment, the application 24 may wait until it determines that the mobile computing device 20 has left the MR zone 62 before returning to 415. In this manner, the application 24 may present the notification 420 a single time each time the customer enters the zone 62. Other schemes of intelligently presenting the notification at 420 without nagging the customer with continual notifications are possible.

If the customer at 425 elects to initiate the in-vehicle return process, the application 24 at 430 may send a notification to the MR system 58 that informs the MR system 58 that the customer intends to return the items 53 and that a MR associate should gather any in-exchange items 53 and prepare to collect the returned items 53 from the customer. The application 24 may use an address associated with the MR system 58 of the selected store 50 to send or otherwise provide an email message, a text message, a push notification, an instant message, or some other form of notification that informs the MR system 58 that the customer wishes to initiate in-vehicle return process.

The application 24 at 440 may initiate and present the customer with a timer in response to initiating the in-vehicle return process at 425. In one embodiment, the application 24 presents a timer which counts up and therefore represents the passage of time since initiating the in-vehicle return process at 425. In another embodiment, the application 24 presents a timer which counts down from a guaranteed or targeted processing time. In such an embodiment, the store 25 may have a policy of collecting the returned items 53 and delivering the in-exchange items 53 to the customer's vehicle 66 within a specified period of time (e.g. 5 minutes) from initiating the in-vehicle return process at 425. The timer in such an embodiment therefore depicts the time remaining for completing the return. In some embodiments, the store 50 may provide the customer with some form of compensation if the MR associate is unable to complete the return in the allotted time. For example, the store 50 may provide the customer with a coupon, store credit, a refund, partial refund, and/or some other form of compensation in an attempt to incentives customers to use their services.

The application 24 at 445 may further provide the customer with content targeted at the customer, additional return directions, and/or other information received from the MR system 58 while the customer awaits collection of the returned items 53 from their vehicle 66. In some embodiments, the targeted content may include coupons, discounts, incentives to purchase items; may include audio, video, and/or textual messages; may also sweepstake and/or other contest opportunities; and may also include social engagement options such as posting aspects of the return to social networking environments (e.g., community maintained by store 50, Twitter, Facebook, etc.). Moreover, the MR system 58 may customize the targeted content based on the customers profile 32 and/or previously purchased items 53.

After collecting the returned items 53 and finalizing the return, the application 24 at 450 may receive and present a notification from the MR system 58 that confirms completion of the return. Such a return complete notification may include additional information regarding the return such as reward points earned, warranty information, rebates, and/or offers for related items 53.

Figure 5:
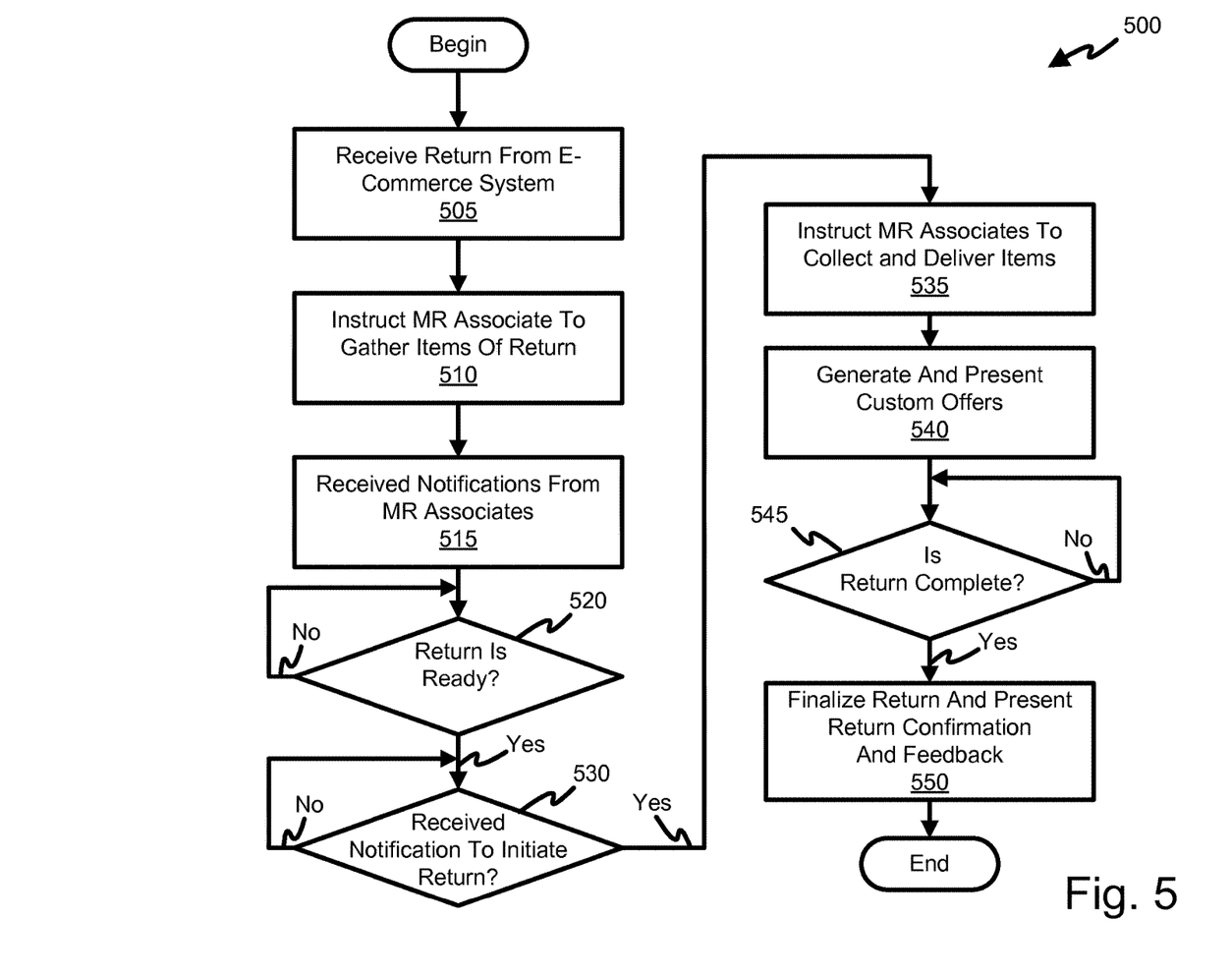
FIG. 5 shows a process implemented by an example embodiment of the merchandise return system of FIG. 1.

Referring now to FIG. 5, a process 500 that may be implemented by the MR system 58 is shown. As noted above with respect to FIG. 3, the e-commerce system 30 at 370 may notify the store 50 of the return request. At 505, the MR system 58 may receive a notification of the return request from the e-commerce system 30. In response to such notification, the MR system 58 at 510 may instruct one or more MR associates to prepare for the requested in-vehicle return. Such preparation may include, among other things, ensuring that an MR associate is available to process the in-vehicle return when the customer arrives at the return location 64 and requesting any in-exchange items 53 be gathered prior to the customer's arrival. To this end, each MR associate, in one embodiment, has a computing device 70 such as a tablet, smartphone, or other portable computing device. Via such computing devices 70, the MR system 58 may query one or more MR associates regarding their availability to process the requested in-vehicle return. Moreover, if the requested in-vehicle return includes any in-exchange items 53, then the MR system 58 may also instruct the same MR associate and/or one or more other MR associates via respective computing devices 70 to gather the in-exchange items 53 and ready them for delivery to the return location 64. In particular, the MR associates may gather the in-exchange items 53 and place the gathered items 53 in designated areas, lockers, bins, etc. located near the return location 64. Such gathering and storing in designated areas, lockers, bins, etc. may enable quick retrieval and delivery of the in-exchange items 53 once the customer's vehicle 66 arrives at the return location 64.

At 515, the MR system 58 may receive notifications from the MR associates via respective computing devices 70 that at least one MR associate is available to process the in-vehicle return once the customer arrives and that the in-exchange items 53 have been gathered and readied. The MR system 58 at 520 may determine, based on notifications received from the MR associates, whether the store 50 is ready to process the requested in-vehicle return once the customer arrives. If one or more items 53 are not yet ready or an MR associate is not available to process the in-vehicle return, the MR system 58 may return to 515 to receive additional notifications from the MR associates. Otherwise, the MR system 58 may notify the customer that the store 50 is prepared to process the requested in-vehicle return. As explained above with respect to 410 of FIG. 4, the MR system 58 may use an address associated with the customer to send or otherwise provide an email message, a text message, a push notification, an instant message, or some other form of notification that informs the application 24 of the customer's mobile computing device 20 that the store 50 is prepared to process the requested in-vehicle return.

As noted above with respect to 435 of FIG. 4, the application 24 may send or otherwise provide the MR system 58 with an email message, a text message, a push notification, an instant message, or some other form of notification that informs the MR system 58 that the customer wishes to initiate the in-vehicle return process. Accordingly, the MR system at 530 may determine whether a notification to initiate a readied in-vehicle return has been received from an application 24. If the MR system 58 determines that such a notification has not been received, then the MR system 58 may wait at 530 until such a notification is received.

In response to determining that such a notification has been received, the MR system 58 at 535 may notify one or more MR associates via respective computing devices 70 to collect the returned items 53 and deliver any in-exchange items 53 to the customer. In one embodiment, the MR system 58 may provide such notification via an email message, a text message, a push notification, an instant message, or some other form of notification that instructs the MR associate to collect the returned items 53 and deliver any in-exchange items 53 to/from the customer's vehicle 66 at a return location 64. In particular, such notification may identify the returned items 53 to be collected, the in-exchange items 53 to be delivered, a location (e.g., designated area, locker, bins, etc.) from which the in-exchange items 53 may be retrieved, a return location 64 from/to which the items 53 are to be collected/delivered, as well as a description of the customer's vehicle 66.

While the MR associates collect and deliver the relevant items 53, the MR system 58 at 540 may provide targeted content to the customer via the application 24 As noted above with respect to 445, the targeted information may include coupons, discounts, incentives to purchase items, may include audio, video, and/or textual messages, may include sweepstake and/or other contest opportunities, and may include social engagement options such as posting aspects of the return to social networking environments (e.g., community maintained by store 50, Twitter, Facebook, etc.). Moreover, the MR system 58 may customize the targeted content based on the customers profile 32 and/or previously purchased items 53.

At 545, the MR system 58 may determine whether the returned items 53 have been collected from the return location 64 and whether the in-exchange items 53 have been delivered to the return location 64. In one embodiment, the MR associate may verify the identity of the customer prior to collecting the returned items 53 and delivering the in-exchange items. To this end, the MR associates may confirm that the vehicle 66 matches the description of the vehicle that the MR system 58 provided to their computing device 70. Moreover, the MR associate swipe the credit card or debit card used by the customer to originally purchase the returned items 53. The computing device 70 and MR system 58 may verify whether the swiped card matches the card used to purchase the returned items 53. The MR associate may further require that the customer provide a picture identification card such as a driver's license and verify that the name on the identification card matches the name associated with the requested return and that the picture on the identification card matches the customer. In addition to or alternatively to swiping the card and verifying a customer identification card, the MR associate may further scan or enter and RMA code for the return. As noted above, the MR system 58 at 360 of FIG. 3 may provide the customer with an RMA code. The MR system 58 may uses this RMA code to verify the customer and ensure the proper in-vehicle return is being processed. In response to this verification process, the MR system 58 may receive one or more confirmations and/or other messages from the MR associate and may determine at 545 whether return items 53 have been collected and in-exchange items 53 have been delivered.

In response to determining that collection and delivery has been completed, the MR system 58 at 550 may finalize the return and notify the customer that the return is complete. In particular, the MR system 58 may finally submit the customer's credit card information to a card processing service if a credit or debit of the card is proper for the return. Moreover, the MR system 58 may send the application 24 of the customer a notification confirming completion of the return. Such notification may include additional information such as reward points earned, warranty information, rebates, and/or offers for related items 53.

The processes of FIGS. 3-5 were described above with respect to a customer returning item or items 53 to an in-vehicle return location 64 of a store 50. Aspects of such return process, however, may be generally applicable to returning items 53 to a store 50. In particular, aspects of the above process may be suitable for use in a system where items 53 are not returned to an in-vehicle return location 64 external to the store 50 but instead to a return location, customer service counter, or other location within the store 50.

The processes of FIGS. 3-5 were mainly described from the perspective of completely delivering any in-exchange items 53 to a customer at a return location 64. Situations may arise where a complete delivery of in-exchange items 53 is not feasible. For example, one or more items 53 may not fit in the customer's vehicle 66 due to the customer underestimating the size of a large item 53 (e.g., a 70" television) or the overall size of the in-exchange items 53. The customer may, therefore, need to return with a larger vehicle 66 or pickup the in-exchange items 53 across multiple trips. In such situations, the application 24 and/or a computing device 70 of a MR associate may permit a partial delivery of the in-exchange items 53 and mark remaining items 53 to be picked-up at a later time.

In some embodiments, the customer may request in-exchange one or more items 53 that are not currently in stock at the store 50. As the items arrive at the store 50, the MR system 58 may inform the application 24 of the arrived items 53. The customer may then elect to proceed with the return in order to receive the available in-exchange items 53 in a manner similar to the processes depicted in FIGS. 3-5 or may elect to wait until all in-exchange items have arrived. Regardless, the MR system 58 may reserve such in-exchange items 53 until at least all in-exchange items 53 of the return have arrived. In this manner, the customer may accept partial delivery of certain in-exchange items 53 via the in-vehicle return location 64 without necessarily waiting for the arrival of all in-exchange items 53.

The above in-vehicle return process provides much flexibility to customer and the store 50. In particular, the processes of FIGS. 3-5 do not require the customer to schedule a particular time for returning the items 53. As such, the customer may return the items 53 when convenient to the customer. Moreover, such moment of convenience may have been unplanned or unforeseeable at the time of requesting the return since it's not uncommon for a customer's plans to change without notice. At the same time, the store 50 does not need to schedule return times, reschedule missed returns, or otherwise waste employee time waiting for customers that are either late for a return or miss their allotted return time all together.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices performing various aspects of the processes depicted in FIGS. 3-5.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method, comprising:
receiving a selection, made by a consumer on a mobile communication device, of an item to be returned to a store;
receiving an input, via the mobile communication device, of information identifying the vehicle that is used to return the purchased item;
monitoring a global location of the mobile communication device;
determining the mobile communication device is in a defined zone outside of the store by:
monitoring a signal transmitted from a transmitter of the store,
detecting the defined zone according to the monitored signal, and
comparing the monitored global location of the mobile communication device to the defined zone;
presenting, via the mobile communication device, a notification to initiate the return, wherein the notification is removed if the mobile communication device leaves the defined zone before initiating the return;
upon initiating the return, starting a timer; and
presenting an elapsed time via the mobile communication device.

2. The method of claim 1, comprising:
upon initiating the return, presenting targeted content to the customer via the mobile communication device.

3. The method of claim 1, comprising:
upon initiating the return, presenting directions, for executing the return, to the customer via the mobile communication device.

4. The method of claim 1, comprising:
altering one or more operating characteristics of the mobile communication device in response to receiving a confirmation for the return.

5. A non-transitory computer readable storage device comprising a plurality of instructions, that in response to being executed, cause a mobile communication device to:
transmit a selection, made by a consumer on the mobile communication device, of an item to be returned to a store;

communicate, via the mobile communication device, information identifying the vehicle that is used to return the purchased item;

communicate a global location of the mobile communication device, wherein entry a defined zone outside of the store is confirmed by:
- detecting the defined zone according to a monitored signal from a transmitter at the store, and
- comparing the global location of the mobile communication device to the defined zone;

receive a notification to initiate the return, wherein the notification is removed if the mobile communication device leaves the defined zone before initiating the return; and display a timer, upon the return being initiated.

6. The non-transitory computer readable storage device of claim 5, wherein the mobile communication device is caused to:
- present targeted content to the customer, upon the return being initiated.

7. The non-transitory computer readable storage device of claim 5, wherein the mobile communication device is caused to:
- present directions, for executing the return, to the customer, upon the return being initiated.

8. The non-transitory computer readable storage device of claim 5, wherein the mobile communication device is caused to:
- alter one or more operating characteristics of the mobile communication device in response to a confirmation of the return.

9. A system, comprising:
a mobile communication device; an application for the mobile communication device, wherein the application in response to being executed, causes the mobile communication device to:

transmit a selection, made by a consumer on the mobile communication device, of an item to be returned to a store;

communicate, via the mobile communication device, information identifying the vehicle that is used to return the purchased item;

communicate a global location of the mobile communication device, wherein entry a defined zone outside of the store is confirmed by:
- a detection of the defined zone according to a monitored signal from a transmitter at the store, and
- a comparison of the global location of the mobile communication device to the defined zone;

receive a notification to initiate the return, wherein the notification is removed if the mobile communication device leaves the defined zone before initiating the return; and display a timer, upon the return being initiated.

10. The system of claim 9, wherein the mobile communication device is caused to present targeted content to the customer, upon the return being initiated.

11. The system of claim 9, wherein the mobile communication device is caused to present directions, for executing the return, to the customer, upon the return being initiated.

12. The system of claim 9, wherein the mobile communication device is caused to alter one or more operating characteristics of the mobile communication device in response to a confirmation of the return.

* * * * *